United States Patent
Nothhelfer et al.

(10) Patent No.: US 6,634,215 B1
(45) Date of Patent: Oct. 21, 2003

(54) METHOD FOR INTEGRALLY DETECTING LEAKS IN TEST PIECES WITH RELATIVELY THIN WALLS

(75) Inventors: Markus Nothhelfer, Karpen (DE); Rudi Widt, Köln (DE)

(73) Assignee: Inficon GmbH (DE)

( * ) Notice: Subject to any disclaimer, the term of this patent is extended or adjusted under 35 U.S.C. 154(b) by 0 days.

(21) Appl. No.: 09/807,169

(22) PCT Filed: Jul. 2, 1999

(86) PCT No.: PCT/EP99/04574

§ 371 (c)(1),
(2), (4) Date: Apr. 9, 2001

(87) PCT Pub. No.: WO00/22401

PCT Pub. Date: Apr. 20, 2000

(30) Foreign Application Priority Data

Oct. 10, 1998 (DE) .......................................... 198 46 801

(51) Int. Cl.[7] .................................................. G01M 3/04
(52) U.S. Cl. ............................. 73/49.2; 73/40.7; 73/38; 73/49.3; 73/49.8
(58) Field of Search ................................ 73/49.2, 40.7, 73/38, 49.3, 49.8

(56) References Cited

U.S. PATENT DOCUMENTS 4,205,551 A * 6/1980 Clifford et al. .............. 73/49.2
4,733,555 A   3/1988 Franks
5,499,529 A   3/1996 Kronberg et al.

FOREIGN PATENT DOCUMENTS

| DE | 2926112  | 1/1981  |
| DE | 19642099 | 4/1998  |
| WO | 97/39322 | 10/1997 |

OTHER PUBLICATIONS

Patent Abstracts of Japan, vol. 012, No. 100 (P–683), (Apr. 2, 1988), JP62 233758 Nippon Kogyo Kensa KK, (Oct. 14, 1987) Zusammenfassung.

* cited by examiner

Primary Examiner—Helen Kwok
Assistant Examiner—André K. Jackson
(74) Attorney, Agent, or Firm—Wall Marjama & Bilinski LLP

(57) ABSTRACT

The invention relates to a method for the integral leak detection on test samples with relatively thin walls, in which the test sample (1) comprising the test gas is tested for leaks in a test chamber; in order to test whether or not test samples are properly filled with test gas, it is proposed that for checking the test gas concentration in the test samples (1), the test gas concentration in at least one of the test samples (1) is measured thereby that its wall (2) is provided with a leak (4), and that with this test sample (1) a leak detection process is carried out.

5 Claims, 1 Drawing Sheet

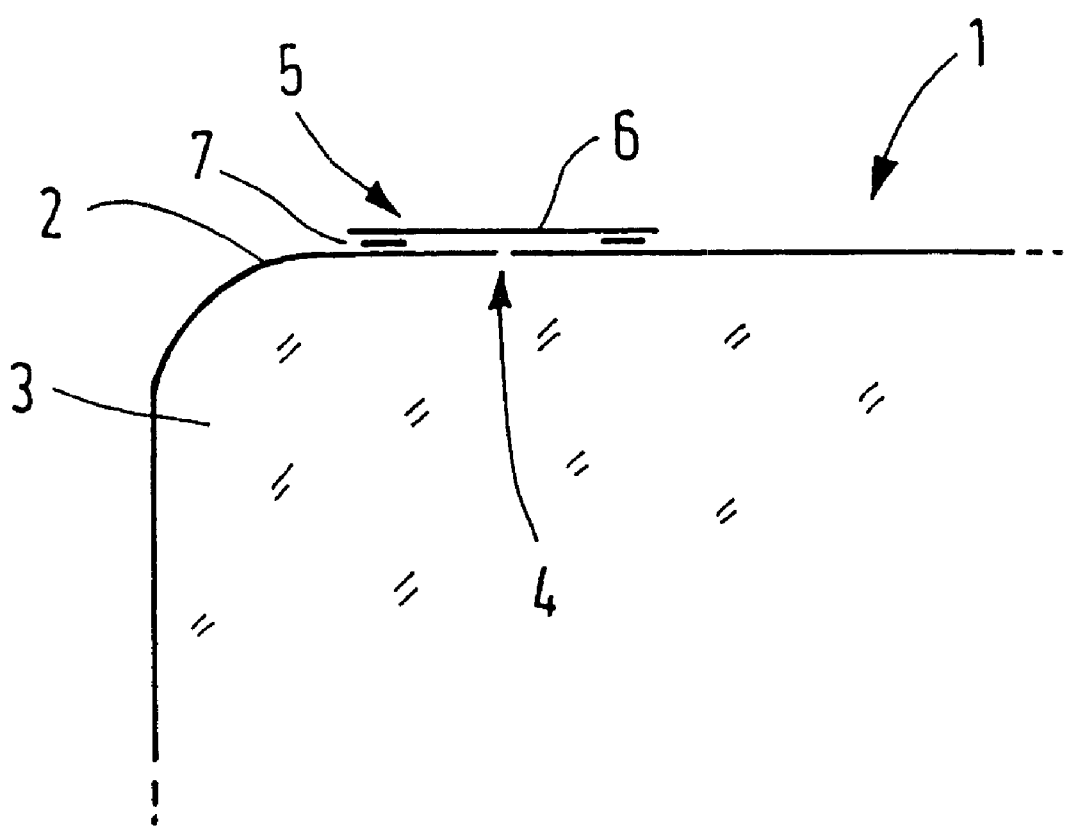

METHOD FOR INTEGRALLY DETECTING LEAKS IN TEST PIECES WITH RELATIVELY THIN WALLS

BACKGROUND OF THE INVENTION

The invention relates to a method for the integral leak detection on test samples comprising a test gas with relatively thin walls, in which the test samples are examined for leaks in a test chamber.

From DE-A-196 42 099 a film leak detector is known. The test for impermeability takes place in such manner that the test sample comprising test gas being examined for leaks is introduced into a test chamber formed by two expandible films. This prior known device is in particular suitable for testing the impermeability of the packaging of packaged food items (chocolate bars, coffee, etc.), pharmaceutical agents (for example tablets) or objects aseptically packaged for use in medical practice, etc. The packaging of these items must be impermeable since atmospheric oxygen or microbes must be kept from penetrating the product. In particular packaged products of this type are referred to in the present application as test samples with relatively thin walls. The packaging forms the "thin wall". As a rule, helium serves as the test gas.

In the case of test samples of this type, which are produced in large production numbers, leak detection can only be carried out in the manner of random sampling. If from a test sample subjected to a random sampling no test gas is emitted, the following possibilities exist:

it is impermeable;
it is grossly permeable (the test gas has already leaked out before the test sample had reached the test chamber;
it is permeable; however, it contains no test gas.

In order to be able to interpret the measuring result better, at the conclusion of the impermeability test a test gas concentration measurement of the gas atmosphere of the content of the packaging would have to be carried out. In the simplest case this could take place by inserting a suitable probe of a sniffing leak detector. However, the smaller the gas volume in the test sample, the more uncertain this checking step becomes. A small volume of gas contained in the packaging is drawn off relatively rapidly by the sniffing probe and can either not be demonstrated at all or at least not completely. In addition, the danger exists of obstructing the sniffing probe if there are powder-form products in the test sample.

The present invention is based on the task of providing, in the case of a method of the type discussed in the introduction, a checking step which is improved with respect to its certainty and reliability.

SUMMARY OF THE INVENTION

This task is solved according to the invention thereby that for checking the test gas concentration in the test samples, the test gas concentration is measured in at least one of the test samples thereby that the wall of this test sample is provided with a leak, and that a leak detection process is carried out with this test sample. The test sample serving for checking the test gas concentration is usefully a test sample which in a preceding leak detection process had been demonstrated to be impermeable.

If examination of the test sample provided with the leak reveals that it contains test gas in the desired concentration, its packaging was impermeable before the generation of the leak. Based thereon the conclusion can be drawn that all other test samples of this series are impermeable. If the test sample serving for checking the test gas concentration does not contain the desired test gas concentration, it is probable that production errors have occurred, be that that the packaging is permeable or that the test sample had not been filled properly with test gas.

Generating a sufficiently small leak in the wall of a test sample is difficult. The insertion of a relatively thin needle already generates a gross leak, which no longer permits reliable concentration measurements. The danger exists that the test gas already leaks completely out of the test sample at the beginning of the leak detection cycle, thus during the evacuation of the test chamber and before switching to the leak measurement. Within the scope of the invention, it is further proposed to provide the test sample with a defined leak. This is accomplished thereby that the test sample to be examined, for example, is pierced with a needle and subsequently the hole is immediately closed with a patch leak. Since, as a rule, the total pressure within and outside of the packaging is identical or at least not significantly different, there are no changes between the piercing and the application of the patch leak or only minor ones in terms of the concentration in the test sample. Subsequently, a new leak detection is carried out in the test chamber. The patch leak represents a defined permeability. This permeability is so slight that during the test the concentration in the packaging does not change. The leak rate signal displayed in this test is a measure of the test gas concentration in the package.

BRIEF DESCRIPTION OF THE DRAWINGS

Further advantages and details of the invention will be explained in conjunction with a FIGURE which illustrates a thin wall package undergoing a leak detection test.

DESCRIPTION OF THE INVENTION

The FIGURE depicts a portion of a test sample 1 with a relatively thin wall 2 (for example a packaging envelope) and with its content 3 which can be a packaged object of any type (also powder). If test samples 1 of this type are produced in large production numbers, it is useful to introduce into at least some of these test samples a test gas in order to be able to test them for leaks on the basis of random sampling. When using helium as the test gas, this usefully takes place with a concentration of up to 100%, preferably 10%. If, during random sample leak testing of the depicted, still intact, test sample, the presence of helium has not been demonstrated, it must be determined whether or not such is, in fact, an impermeable test sample. This takes place by measuring the concentration of the test gas in the test sample. For this purpose the test sample is provided, for example using a needle, with a leak 4 over which the patch leak 5 is applied. The packaging is subsequently again placed into the test chamber and tested for a leak. As described earlier, based on the result conclusions can be drawn regarding the production quality.

The patch leak comprises a very thin film section 6 permeable by the test gas. If it is not self-adhesive, it can be provided with an adhesive margin 7. The patch leak is subsequently adhered in the manner of an adhesive bandage on the leak 4 generated by piercing the packaging. As material for the film a fluorocarbon has been found to be useful. The thickness and the free area of the film determine the leakage rate. With respect to helium as the test gas applies that a fluorocarbon film with a thickness of 25 $\mu$m has a leakage rate of approximately $10^{-4}$ mb·l/s·cm².

The invention has been described in conjunction with a film leak detector of the type known from DE-A-196 42 099, which serves preferably for testing the impermeability of packagings and the disclosure of which is incorporated herein by reference. It is, however, not limited to leak detectors nor to test samples of this type. This invention can be applied to any other leak detector with the capability of integrally testing for leaks test samples containing test gas. With respect to the test samples, it is assumed that their wall permits providing them intentionally with a leak after a first leak detector process.

In the method disclosed in DE-A-196 42 099, it is assumed that a test gas is disposed within the packaging. This can be, for example, a protective gas for the packaged good (e.g., nitrogen, argon, carbon dioxide or the like). Another option is to ensure within the course of the packaging process that within the packaging a typical test gas, such as helium, is disposed. It is essential that a detector be capable of differentiating the test gas present in the packaging of the packaged object from air. It is especially advantageous if the packaging includes a helium gas fraction which is 5 to 25%, preferably 10%.

The leak testing of the packaging preferably takes place in such manner that the packaged object is introduced into a test chamber which is formed by two extensible films. A space containing the packaged object between the films is evacuated such that the films are capable of enclosing the packaged object. The films, at least in the regions of their surfaces which face the packaged object and in which the leak testing of the packaging is to take place, include means which form a continuous interspace over the regions of the packaging to be tested. This interspace is evacuated to a pressure which is lower than the pressure within the packaging. To determine whether or not test gas penetrates to the outside through the region of the packaging to be tested, the evacuated interspace is connected with a detector sensitive to the test gas.

What is claimed is:

1. Method for the integral leak detection on test samples with relatively thin walls, in which the test samples (1) comprising test gas are tested for leaks in a test chamber, characterized in that for checking the test gas concentration in the test samples (1), the test gas concentration in at least one of the test samples (1) is measured thereby that its wall (2) is provided with a leak (4), with a known loss rate and that with this test sample (1) a leak detection process is carried out wherein said test sample, which serves for checking the test gas concentration, is a test sample which in a preceding leak detection process has been found to be impermeable.

2. Method as in claim 1 wherein immediately after the leak (4) has been generated, the leak (4) is closed with a patch leak (5) permeable by the test gas and of known permeability with respect to the test gas.

3. Patch leak for carrying out the method as claimed in claim 2, characterized in that it comprises a film section (6) permeable by test gas.

4. Patch leak as claimed in claim 3, characterized in that it is provided on one side with an adhesive means (7).

5. Patch leak as claimed in claim 4, characterized in that it is round and equipped with an encompassing adhesive margin (7).

* * * * *